United States Patent [19]
Johnston

[11] 3,958,638
[45] May 25, 1976

[54] METHOD FOR ALTERING THE PERMEABILITY OF A SUBTERRANEAN FORMATION

[75] Inventor: Chester C. Johnston, Dewey, Okla.

[73] Assignee: Phillips Petroleum Company, Bartlesville, Okla.

[22] Filed: June 16, 1975

[21] Appl. No.: 587,182

[52] U.S. Cl. .............................. 166/294; 166/295
[51] Int. Cl.² ...................................... E21B 33/138
[58] Field of Search ........................... 166/292–295, 166/300, 309, 288; 252/316

[56] References Cited
UNITED STATES PATENTS

| | | | |
|---|---|---|---|
| 2,748,867 | 6/1956 | Lissant | 166/309 |
| 3,141,513 | 7/1964 | Davis | 166/300 X |
| 3,237,693 | 3/1966 | Huitt et al. | 166/280 |
| 3,420,299 | 1/1969 | Cloud | 166/288 UX |
| 3,658,129 | 4/1972 | Lanning et al. | 166/294 X |
| 3,727,687 | 4/1973 | Clampitt et al. | 166/294 X |
| 3,749,172 | 7/1973 | Hessert et al. | 166/295 X |
| 3,762,476 | 10/1973 | Gall | 166/295 X |

Primary Examiner—Stephen J. Novosad

[57] ABSTRACT

A method for altering the permeability of a subterranean formation in which aqueous polymer solution and encapsulated reacting agent is passed into the formation with subsequent release of reacting agent in response to formation conditions causing a reaction that thickens the polymer solution.

15 Claims, No Drawings

METHOD FOR ALTERING THE PERMEABILITY OF A SUBTERRANEAN FORMATION

BACKGROUND OF THE INVENTION

This invention relates to the production of gaseous or liquid materials from subterranean formations. In one of its aspects this invention relates to altering the permeability of the subterranean formation. In yet another of its aspects this invention relates to the in situ formation of gels within a subterranean formation. In yet another of its aspects this invention relates to the use of encapsulated gelation agents for transporting gelation agents to a desired site for producing gel within a subterranean formation. In an operation for recovering hydrocarbons from subterranean hydrocarbon-containing formations penetrated by at least one wellbore, it is often desirable to alter the fluid flow paths through the formation for controlling the fluids recovered from the formation. Among examples of types of fluid control in a subterranean formation known in the art are: water shut off, directing flooding fluid flow paths to other portions of the formation, and plugging the formation. In carrying out these processes of fluid control viscous material is often pumped into the formation. It would be advantageous to be able to increase viscosity of material pumped into a subterranean formation at the points within the formation that the increased viscosity is to be used instead of being required to pump highly viscous material down the wellbore and through the formation as must be done by the processes of the prior art.

It is therefore an object of this invention to provide a method for delaying the viscosity increase in materials pumped into a subterranean formation until the extremities of the perforated formation are reached by the pumped material. It is another object of this invention to provide a method for fluid control in a subterranean formation in which gelation occurs in situ in the formation. It is still another object of this invention to provide an efficient and economical fluid control system for subterranean formations.

Other aspects, objects and the advantages of the present invention will become apparent from a study of the disclosure and the appended claims.

STATEMENT OF THE INVENTION

According to this invention a method is provided for altering the permeability of a subterranean hydrocarbon-containing formation penetrated by a least one wellbore. In the method of this invention an aqueous solution of a polymer that can be crosslinked to produce a gel is passed through a wellbore and into the formation along with an encapsulated gelation agent in sufficient quantities to cause gelling of the polymer upon contact. The encapsulating material for the gelation agent is chosen from materials that melt upon contact with the temperature of the subterranean formation environment to release the encapsulated gelation agent thereby causing an increase in the viscosity of the polymer solution within the formation by gelling of the polymer.

In one embodiment of the invention the aqueous polymer solution used is chosen from materials requiring contact with both a reducing agent and a compound of a polyvalent metal capable of being reduced to a lower valence state, hereinafter referred to also as an oxidizing agent, to produce a gel.

In a further embodiment of the invention either the reducing agent or the oxidizing agent or both can be encapsulated and passed as an encapsulated gelling agent into the subterranean formation with the aqueous polymer solution.

In another embodiment of the invention only an oxidizing agent is passed into the subterranean formation in encapsulated form so that the aqueous polymer solution is gelled upon release of the encapsulated oxidizing agent in the presence of the polymer solution and hydrogen sulfide naturally occurring within the subterranean formation.

In the method of this invention, the porosity of a subterranean formation is altered with a polymer solution having at least one encapsulated gelation agent incorporated therein, for example, a water soluble compound of polyvalent metal wherein the metal present is capable of being reduced to a lower valence state, or a reducing agent capable of reducing said metal to said lower valence state. Either or both of said metal compound, or said reducing agent can be encapsulated in a material such as paraffin wax which, upon melting, releases the encapsulated material for contact with the polymer solution which results in viscosity increase or gelling. Encapsulating the reacting agent provides means for delaying the gelling process. Natural heat at formation levels can be used to melt the encapsulating agents allowing either the oxidation agents or reducing agents contained therein to be released. In certain instances, it is desirable to encapsulate the oxidizing agent and add no reducing agent, relying on sour gas found in the formation to serve as the reducing agent which, upon contact with the released oxidizing agent, results in a highly viscous gel.

Solutions of water soluble, or water dispersible, polymers, such as cellulose ethers, polyacrylamides, polysaccharides or mixtures thereof can be gelled in accordance with this invention.

The polymeric materials which are suitable for use in the practice of the invention include at least one chemically crosslinkable, water-dispersible polymer selected from the group consisting of polyacrylamides and related polymers, cellulose ethers, polysaccharides, and mixtures thereof, which upon contact with gelatin agents described herein can be crosslinked or gelled in an aqueous medium. Where used, in the specification and in the claims, unless otherwise specified, the term "polymer" is employed generically to include both homopolymers and copolymers; and the term "water-dispersible polymer" includes both those polymers which are truly water-soluble and those which are dispersible in water or other aqueous medium to form stable colloidal suspensions which can be gelled as described herein. The word "water" is employed generically herein and in the claims, unless otherwise specified, to include both fresh water and oil field brines such as are commonly available in producing oil or gas fields. Such brines commonly contain varying amounts of sodium chloride, calcium chloride, magnesium chloride, etc., in a wide range of total dissolved solids content, e.g., from about 850 ppm by weight, or less, to 90,000 ppm by weight, or more.

Among the water-soluble and water-dispersible compounds useful in this invention are cellulose ethers which include, among others: the various carboxyalkyl cellulose ethers, e.g., carboxyethyl cellulose and caroboxymethyl cellulose (CMC); mixed ethers such as carboxyalkyl hydroxyalkyl cellulose ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. The carboxy-substituted cellulose ethers are available as the alkali metal salt, usually the sodium salt. However, the metal is seldom refered to and they are commonly referred to as CMC, CMHEC, etc. For example, water-soluble CMC is available in various degrees of carboxylate substitution ranging from about 0.3 up to the maximum degree of substitution of 3.0. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above preferred ranges is usually less uniform in properties and thus less desirable for use in the practice of the invention. CMC having a degree of substitution greater than the above preferred ranges usually has a lower viscosity and more is required in the practice of the invention. Said degree of substitution of CMC is commonly designated in practice as CMC-7, CMC-9, CMC-12, etc., where the 7, 9, and 12 refer to a degree of substitution of 0.7, 0.9, and 1.2, respectively.

The polyacrylamides and related polymers which can be used in the practice of the present invention include polymers selected from the group consisting of: polyacrylamides and polymethyacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from 1 to 4 carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and admixtures of such polymers. Presently preferred polyacrylamide type polymers include the various substantially linear homopolymers and copolymers of acrylamide and methacrylamide. By substantially linear it is meant that the polymers are substantially free of crosslinking between the polymer chains. Said polymers can have up to about 75, preferably up to about 45, percent of the carboxamide groups hydrolyzed to carboxyl groups. As used herein and in the claims, unless otherwise specified, the term "hydrolyzed" includes modified polymers wherein the carboxyl groups are in the acid form and also such polymers wherein the carboxyl groups are in the salt form, providing said salts are at least water-dispersible. Such salts include the ammonium salts, the alkali metal salts, and others which are at least water-dispersible. Hydrolysis can be carried out in any suitable fashion, for example, by heating an aqueous solution of the polymer with a suitable amount of sodium hydroxide.

Representative of the polysaccharides which can be used in the practice of the invention are the heteropolysaccharides produced by fermentation of carbohydrates by bacteria of the genus Xanthomonas. Exemplary of such heteropolysaccharides are those produced by *Xanthomonas campestris*, *Xanthomonas begonia*, *Xanthomonas phaseoli*, *Xanthomonas hederae*, *Xanthomonas incanae*, *Xanthomonas carotae*, and *Xanthomonas translucene*. Of these, ionic polysaccharide B-1459 is preferred. The polysaccharide B-1459 is prepared by culturing the bacterium Xanthomonas campestris NRRL B-1459, U.S. Department of Agriculture, on a well-aerated medium containing commercial glucose, organic nitrogen sources, dipotassium hydrogen phosphate, and various trace elements. Fermentation is carried out to completion in 4 days or less at a pH of about 7 and a temperature of 28°C. Polysaccharide B-1459 is commercially available under the trade name of "Kelzan" from the Kelco Company, San Diego, Cal.

All the polymers useful in the practice of the invention are characterized by high molecular weight. The molecular weight is not critical so long as the polymer has the above-described at least water-dispersible properties. It is preferred that the polymer have a molecular weight of at least 100,000. The upper limit of molecular weight is unimportant so long as the polymer is at least water-dispersible. Thus, polymers having molecular weights as high as 20,000,000 or higher, and meeting said conditions, can be used.

Also used in the practice of this invention are water-soluble compounds of polyvalent metals wherein the metal is present in a valence state which is capable of being reduced to a lower valence state. Examples of such compounds include potassium permanganate, sodium permanganate, ammonium chromate, ammonium dichromate, the alkali metal chromates, the alkali metal dichromates, chromium trioxide and mixtures thereof. Sodium dichromate and potassium dichromate, because of low cost and ready availability, are the presently preferred metal containing compounds for use in the practice of the invention.

Reducing agents suitable to be used in the practice of the invention include sulfur-containing compounds such as sodium sulfite, sodium hydrosulfite, sodium metabisulfite, potassium sulfite, sodium bisulfite, potassium metabisulfite, sodium thiosulfate, ferrous sulfate, thioacetamide, and others; and non-sulfur-containing compounds such as hydroquinone, ferrous chloride, p-hydrazinobenzoic acid, hydrazine phosphite, hydrazine dichloride, and others. Some of the above reducing agents act more quickly than others, for example, sodium thisulfate usually reacts slowly in the absence of heat, e.g., requiring heating to about 125°–130°F. The presently most preferred reducing agents are sodium hydrosulfite, potassium hydrosulfite, sodium bisulfite or mixtures thereof.

The chemical reaction by which soluble polymers are crosslinked by contact with polyvalent metal compounds in the presence of reducing agents is well known. For example, U.S. Pat. No. 3,727,687 of Clampitt et al. describes the preparation of aqueous gels resulting from the crosslinking of carboxymethyl-cellulose polymers. Other polymers such as polyacrylamides and polysaccharides are crosslinked in a similar fashion.

In carrying out this invention, the concentration range of polymers can be from about 25 ppm to about 200,000 ppm based on the weight of the water. This can also be stated as 0.0025 weight percent to 20 weight percent based on the weight of the water. Preferably the polymer concentration range is about 250 ppm to about 15,000 ppm based upon the weight of the water, or stated another way, 0.025 weight percent to 1.5 weight percent based upon the weight of the water. The polyvalent metal oxidizing agent concentration can be in the range of about 0.0005 grams to about 0.6 grams of metal ion per gram of polymer or 0.05 weight percent to 60 weight percent of the metal ion based on the weight of the polymer. The preferred range of the polyvalent metal compound is from about 0.005 grams to about 0.3 grams of the metal ion per gram of polymer, or 0.5 weight percent to 30 weight percent based upon the weight of the polymer. In all instances the amount of polyvalent metal compound will be an amount which is sufficient or effective to cause subsequent gelation of the polymer solution when the metal in the polyvalent metal compound is reduced to a lower valence state.

The amount of reducing agent used will usually be in the range from about 0.1 percent to about 200 percent of the stoichiometric amount required to convert the polyvalent metal to a lower valence state, preferably from about 0.5 to about 150 percent of the stoichiometric amount required to convert the polyvalent metal to a lower valence state.

Encapsulating materials which can be used in the practice of the invention include those set forth in Table I below.

TABLE I

| Material | Melting Point Range |
| --- | --- |
| Paraffin Wax | 115 – 155°F |
| Polyethylene (low density) | 210 – 220°F |
| 10% Paraffin Wax; 90% High Density Polyethylene | 230 – 240°F |
| Polyethylene (high density) | 280 – 290°F |
| Polypropylene | 320 – 340°F |

The term "high density" as used herein means a density in the range of 0.941 to 0.970 and the term "low density" means density in the range of 0.910 to 0.940.

Mixtures of paraffin wax and high or low density polyethylene can be used to obtain a certain capsule melting temperature with the paraffin wax content varying from 5% to 95% and the high or low density polyethylene content varying from 95% to 5%. Using different grades of paraffin wax the percent of paraffin wax used will vary in the mixture with polyethylene in obtaining the desired melting point. Other mixtures can be used so long as the encapsulated material is released in response to the environmental condition found in the subterranean formation.

Any procedure or technique which will encapsulate, coat, embed, or otherwise substantially surround particles of the gelation agent with the above-described fusible carrier materials can be employed in the present invention. In one convenient procedure particles of the gelation agent, which can range in size from a fine powder to granules or large crystals, are homogeneously dispersed in a molten mass of the fusible carrier such as wax. This dispersion is then cooled by any convenient means to solidify the mixture. The solid mixture is then broken up, ground, or otherwise converted to particles of convenient size. The final particle size will depend somewhat upon the particle size of the encapsulated gelation agent but will generally range from a fine powder to particles of up to ¼ inch in diameter. The shape of the particles is not critical and can be spheres, cubes, extrudes or other random and irregular forms. The weight ratio of gelation agent to the coating or encapsulating material will generally be in the range of from about 1:10 to 100:1, preferably 2:1 to 1:2.

Capsules of the encapsulating material can be made as hollow balls with the oxidizing agent or reducing agent in solution later injected into the ball with a needle syringe followed by heat sealing of the opening made by the needle. This method of encapsulation is preferably used when higher melting temperature encapsulating materials are used. When lower melting materials are used the catalysts can be mixed into the melted material, as melted paraffin wax as will be described in the example below. Other suitable methods of encapsulation can be used in the practice of the invention.

The permeability of an underground formation is altered by injecting into said formation an amount of aqueous gel composition of the present invention which is sufficient to reduce or shut off the undesirable flow of water. The injection is carried out using conventional procedures and apparatus. In some instances the injection of the invention gel composition can be preceded by the injection of a quantity of viscous polymer which does not contain a gelation agent. When the gelation agent containing polymer solution is injected, either the reducing agent or the oxidizing agent or both can be present in the encapsulated form. Other conventional agents can also be present such as preservatives, gel strengthening agents and the like.

The method of this invention can be used to partially shut off or retard water invading an oil or gas zone through a natural or artificially induced fracture system communicating with said oil or gas zone, e.g., from an aquifer below said zone. The invasion of water can cone into the gas or oil zone thereby reducing the relative permeability to hydrocarbons. In some cases, it is desirable to plug the channels and cracks through which the water is invading. It may be desirable to reperforate the hydrocarbon containing zone or a previously unperforated oil or gas zone lying above the zone where water channeling occurs and following these steps, return the well to a producing status with substantially less water being produced.

The following are examples of the method of this invention:

EXAMPLE

In accordance with the present invention, a test was carried out using one percent CMC (10,000 ppm CMC) in brine with 1,000 ppm sodium bisulfite mixed into the polymer solution. An amount of granular sodium dichromate sufficient to provide a concentration of about 800 ppm in the final aqueous composition was dispersed in melted paraffin. This mixture, allowed to cool, was then broken up into pieces about 1/64 to ⅛ inch in largest dimension. The pieces of paraffin incorporating the sodium dichromate were mixed into the polymer solution containing the reducing agent. No gelation or other reaction took place. Heat was thereafter applied by circulating hot water around the jacket of the cup containing the mixture. When the solution reached the melting point of the wax, between 110° to 120°F, the sodium dichromate was released and the viscosity of the solution increased. Within five minutes stiff gel was formed.

FIELD EXAMPLE

The following calculated example illustrates one application of the invention to field operations. A well in the Burbank Field in Oklahoma, at a depth of 2,900 feet has a bottomhole temperature of about 125°F. When the well starts to produce with an uneconomic water-oil ratio at total fluid production from the well is 1,000 barrels per day, it is shut down.

Placement of a gelled polymer solution in the water zone of the formation as desired to eliminate or retard the influx of brine thereby reducing the water to oil ratio. Gelation of the aqueous solution of polymer is desirably delayed until the solution has been pumped into the well. This is accomplished by the following treatment procedure using in situ gelation and thickening of the polymer solution in accordance with this invention.

A solution containing 10,000ppm CMC by weight water is mixed in produced brine which had been stored in surface tanks and has an ambient temperature of about 75°F. Approximately 1650 lbs. of polymer is mixed into 465 barrels of brine to form a 10,000 ppm solution. After mixing the polymer, 1950 lbs. or 0.1 lb./gal. of diatomaceous earth is added as a gel strengthening agent. The reducing agent is $NaHSO_3$ at a concentration of 1,000 ppm based upon the amount of brine which requires 163 lbs. or 0.35 lb./bbl. of water. The reducing agent is mixed into the brine polymer solution.

About 195 lbs. of an oxidizing agent, $Na_2Cr_2O_7 \cdot 2H_2O$, is encapsulated and the capsules are mixed with the polymer solution as described below. 195 lbs. of sodium dichromate is used to make a concentration of about 1200 ppm in the initial mixing brine (465 bbls.).

The polymer solution is then pumped into the well and fracture, penetrating the producing zone of the subterranean formation along the faces of the fracture at a rate of 1 to 10 bbl./min. The previously prepared capsules containing sodium dichromate dihydrate ($Na_2Cr_2O_7 \cdot 2H_2O$) are then injected into the polymer solution just downstream of the injection pump at a rate to supply 0.42 lbs. of sodium dichromate dihydrate per barrel of the polymer solution which contains the sodium bisulfite and diatomaceous earth. As the ungelled solution containing the capsules reaches the perforations in the casing, the capsules begin to melt dispersing the sodium dichromate throughout the polymer mixture. This dispersing and mixing of the dichromate will cause gelation of the polymer to occur in the subterranean formation away from the wellbore. The polymer slug is followed by a brine slug of approximately 100 barrels to flush the polymer mixture from the wellbore.

Following the treatment, the well is shut in for 24 to 48 hours to permit gelation of the polymer in situ. The well is perforated in a new section above the plugged zone and normal production operations are resumed. The well cleans up and produces crude oil along with less water because of the gelled solution of polymer placed in situ.

I claim:

1. A method for altering the permeability of a subterranean hydrocarbon-containing formation penetrated by at least one wellbore, comprising:
    1. passing aqueous polymer solution into the formation, said polymer capable of reaction to increase the viscosity of the aqueous polymer solution;
    2. passing into the formation a gelation agent which is in an encapsulating material and which is capable of reaction with said polymer to increase the viscosity thereof, said encapsulating material capable of releasing the gelation agent in situ in response to the temperature of the subterranean formation; and
    3. subjecting said encapsulating material to a temperature sufficient to release said gelation agent whereby contact between the gelation agent and aqueous polymer solution increases the viscosity of the aqueous polymer solution.

2. A method of claim 1 wherein said gelation agent is an oxidizing agent and a reducing agent is also present in subterranean formation.

3. A method of claim 2 wherein said gelation agent is an oxidizing agent and the subterranean formation contains naturally occurring hydrogen sulfide.

4. A method of claim 3 wherein the oxidizing agent is a polyvalent metal compound wherein the metal has a valence reducible to a lower valence.

5. A method of claim 4 wherein the oxidizing agent is present in an amount sufficient to provide at least $3 \times 10^{-6}$ gram atoms of the polyvalent metal per gram of polymer.

6. A method of claim 1 wherein said gelation agent is a reducing agent and an oxidizing agent is present in the subterranean formation.

7. A method of claim 1 wherein the gelation agent comprises a mixture of encapsulated oxidizing agent and encapsulated reducing agent.

8. A method of claim 1 wherein the encapsulating material is one of paraffin wax, polyethylene, polypropylene or mixtures thereof.

9. A method of claim 1 wherein the gelation agent is a polyvalent metal compound wherein the metal has a valence reducible to a lower valence.

10. A method of claim 9 wherein the oxidizing agent is one of potassium permanganate, sodium permanganate, ammonium chromate, ammonium dichromate, an alkali metal chromate, an alkali metal dichromate, chromium trioxide or a mixture thereof.

11. A method of claim 9 wherein the oxidizing agent is present in an amount sufficient to provide at least $10 \times 10^{-6}$ gram atoms of the polyvalent metal per gram of polymer.

12. A method of claim 1 wherein the reducing agent is a sulfur-containing compound.

13. A method of claim 12 wherein the reducing agent is one of sodium hydrosulfite, potassium hydrosulfite, sodium bisulfite or mixtures thereof.

14. A method of claim 1 wherein the amount of reducing agent is in the range of about 0.1 percent to about 200 percent of the stoichiometric amount of reducing agent necessary to lower the valence of the oxidizing agent.

15. A method of claim 1 wherein said polymer solution comprises at least one of cellulose ethers, polyacrylamides, polysaccharides, and mixtures thereof.

* * * * *